US012566649B2

(12) United States Patent
Prasad et al.

(10) Patent No.: US 12,566,649 B2
(45) Date of Patent: Mar. 3, 2026

(54) SYSTEM AND METHOD FOR DETECTING AND COMMUNICATING ON-DEVICE INTENT WITH PARTNER APPLICATIONS USING STREAMING PIPE INTER-PROCESS COMMUNICATION

(71) Applicant: TALENT UNLIMITED ONLINE SERVICES PRIVATE LIMITED, Delhi (IN)

(72) Inventors: Ankit Prasad, Jamshedpur (IN); Saurabh Tomar, Gurugram (IN)

(73) Assignee: TALENT UNLIMITED ONLINE SERVICES PRIVATE LIMITED, Delhi (IN)

( * ) Notice: Subject to any disclaimer, the term of this patent is extended or adjusted under 35 U.S.C. 154(b) by 439 days.

(21) Appl. No.: 18/339,722

(22) Filed: Jun. 22, 2023

(65) Prior Publication Data

US 2024/0272966 A1 Aug. 15, 2024

(30) Foreign Application Priority Data

Feb. 15, 2023 (IN) .............................. 202311010020

(51) Int. Cl.
*G06F 9/54* (2006.01)
*G06F 9/48* (2006.01)

(52) U.S. Cl.
CPC ............ *G06F 9/543* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 12,374,330 B1* | 7/2025 | Surkov | .................. | G06F 40/35 |
| 2016/0110235 A1* | 4/2016 | Lindsay | ................. | G06F 9/546 |
| | | | | 719/328 |
| 2017/0061804 A1* | 3/2017 | Navarro Felix | ......... | G08G 5/34 |
| 2019/0163929 A1* | 5/2019 | Miller | .................. | H04L 63/102 |
| 2019/0250789 A1* | 8/2019 | Li | .......................... | G06F 1/3206 |
| 2022/0405635 A1* | 12/2022 | Zhang | .................... | G06Q 10/04 |
| 2023/0254399 A1* | 8/2023 | Qi | ..................... | H04M 1/72415 |
| | | | | 345/1.1 |
| 2025/0013476 A1* | 1/2025 | Wang | ........................ | G06F 9/44 |

* cited by examiner

*Primary Examiner* — Adam Lee
(74) *Attorney, Agent, or Firm* — Dickinson Wright PLLC

(57) ABSTRACT

The present invention provides a method and a system for an on-device intent detection using streaming pipe inter-process communication. The method (100) and system (300) disclosed herein involves an on-device intent detection (ODI), that enables applications to recognize user interests which are essentially keywords as they type using an AI model or algorithm. These keywords are communicated to a partner application, installed on the user's device without using any Application Programming Interface (API) or server, thereby effectively improving performance. The user's list of keywords is saved in an AI model and sending the keywords to the partner application employing Android Interface Definition Language (AIDL) interface for inter-process communication (IPC).

12 Claims, 7 Drawing Sheets

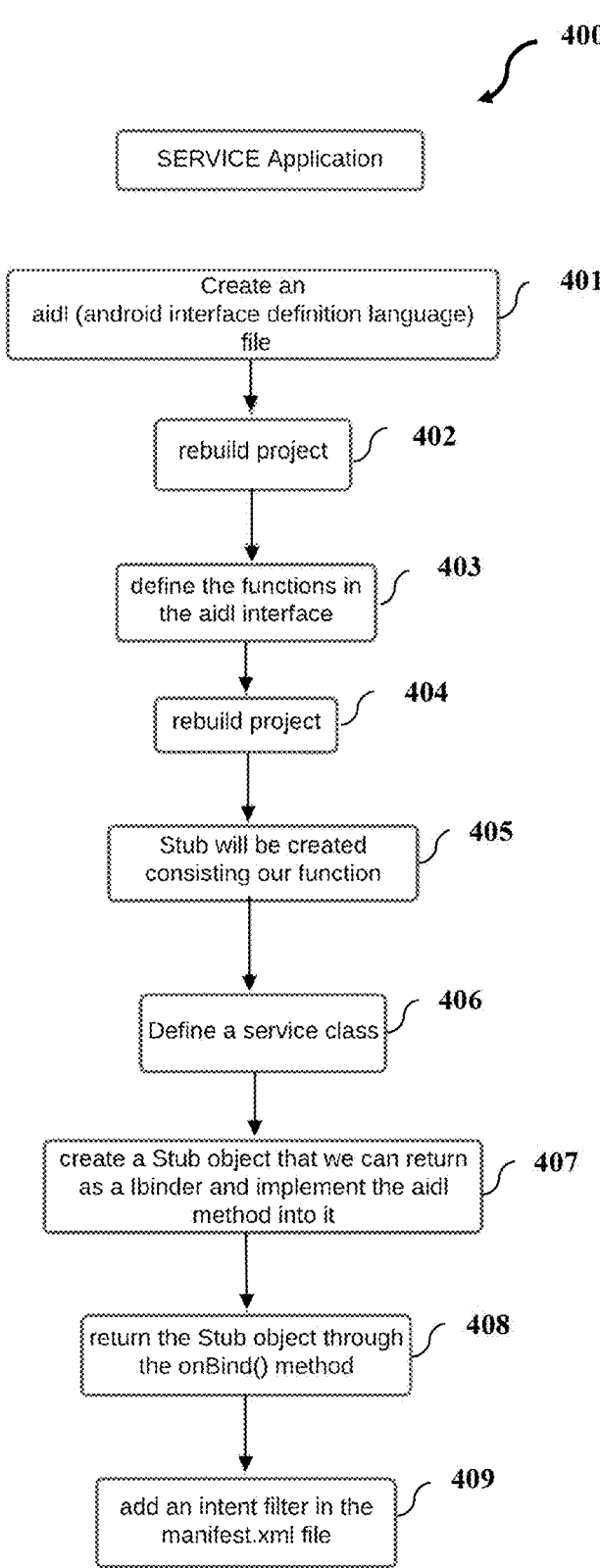

400

SERVICE Application

Create an
aidl (android interface definition language)
file     401 rebuild project     402 define the functions in
the aidl interface     403 rebuild project     404

Stub will be created
consisting our function     405

Define a service class     406 create a Stub object that we can return
as a Ibinder and implement the aidl
method into it     407 return the Stub object through
the onBind() method     408 add an intent filter in the
manifest.xml file     409

FIG 4

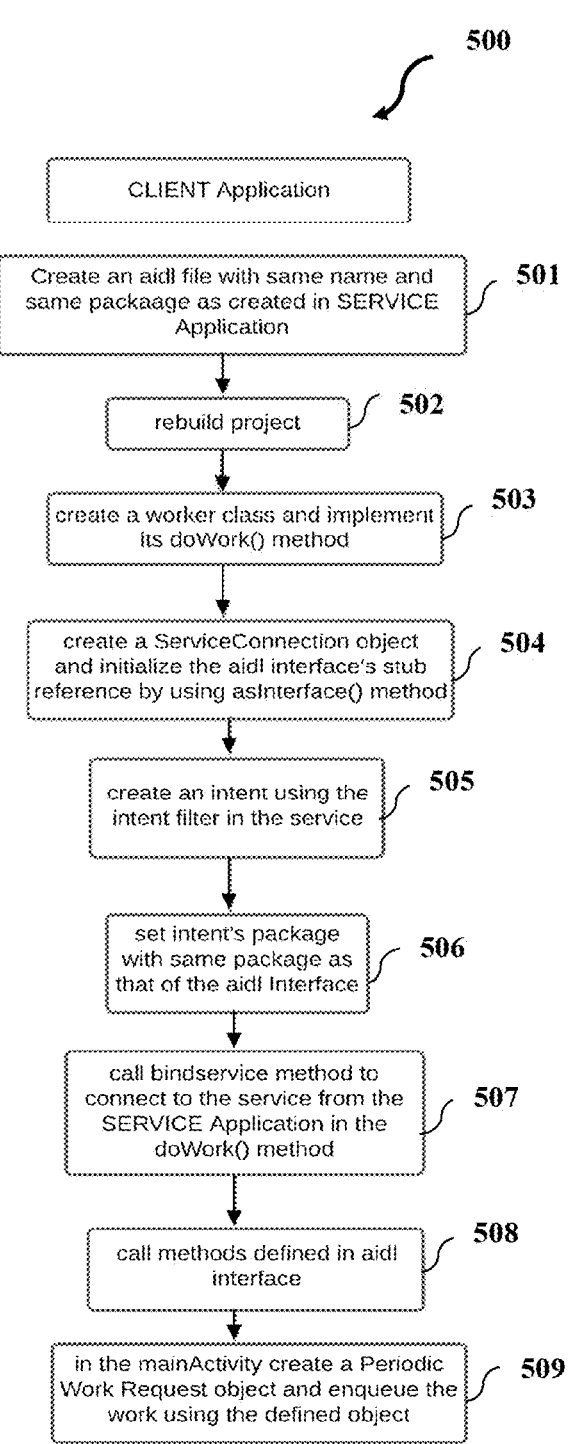

500

CLIENT Application

Create an aidl file with same name and same packaage as created in SERVICE Application — 501 rebuild project — 502 create a worker class and implement its doWork() method — 503 create a ServiceConnection object and initialize the aidl interface's stub reference by using asInterface() method — 504 create an intent using the intent filter in the service — 505 set intent's package with same package as that of the aidl Interface — 506 call bindservice method to connect to the service from the SERVICE Application in the doWork() method — 507 call methods defined in aidl interface — 508 in the mainActivity create a Periodic Work Request object and enqueue the work using the defined object — 509

SYSTEM AND METHOD FOR DETECTING AND COMMUNICATING ON-DEVICE INTENT WITH PARTNER APPLICATIONS USING STREAMING PIPE INTER-PROCESS COMMUNICATION

CROSS-REFERENCE TO RELATED APPLICATIONS

The present application claims the priority from the Indian Non-Provisional Application with serial number 202311010020 filed on Feb. 15, 2022, with the title "A SYSTEM AND METHOD FOR DETECTING AND COMMUNICATING ON-DEVICE INTENT WITH PARTNER APPLICATIONS USING STREAMING PIPE INTER-PROCESS COMMUNICATION". The contents of the abovementioned Application are included in entirety as reference herein.

TECHNICAL FIELD

The present invention is generally related to the field of data science. The present invention is particularly related to inter-process communications with the partner applications installed on a user device. The present invention is more particularly related to a method and system for detecting an on-device intent and sharing the detected intent with the partner applications installed on the user device using streaming pipe inter-process communication, without an involvement of any Application Programming Interface (API) or server, to enable the applications to recognize user's interests that are typed.

BACKGROUND OF THE INVENTION

Intent detection is a vital component of any task-oriented conversational system. In order to understand the user's current goal, the system must leverage an intent detector to classify the user's utterance (provided in various natural languages) into one of several predefined classes, known as, intents. However, the performance of intent detection has been hindered by the data scarcity issue, as it is non-trivial to collect sufficient examples for new intents. Hence there is a need to find ways to effectively identify the user intents in a simple and minimal processes.

At present, intent detection from the social network messages on the computing systems has been developed. The users of the social networks are increasing continuously in a steady manner thereby providing a new source of business opportunity for search engines. The tapping of the data of social networks then offers myriad possible data handling and processing capabilities to not only better serve users but also vendors. Moreover, the ways of providing more effective search results are a continuing challenge for the vendors. Hence, intelligent intent detection from the social network messages are developed. However, the current known alternatives use Application Programming Interface (API) and server to maintain data, which takes a lot of resources and execution time. Furthermore, the current alternatives also need a cloud storage to store the detected intents.

Hence there is a long-felt need for a method and a system for detecting an on-device intent and sharing the detected intent with the partner applications installed on the user device using streaming pipe inter-process communication, and without involving any Application Programming Interface (API) or server, to enable the applications to recognize user's interests that are typed. Further there is a need for an operating system level process for intent detection.

The above-mentioned shortcomings, disadvantages and problems are addressed herein, and which will be understood by reading and studying the following specification.

OBJECT OF THE INVENTION

An object of the present invention is to provide a method and a system for on-device intent detection and communication using streaming pipe inter-process communication without using any API and server.

Another object of the present invention is to provide a method and a system for on-device intent detection, which enables applications to recognize a user interest.

Yet another object of the present invention is to provide a method and a system for on-device intent detection, by employing Artificial Intelligence (AI) algorithm to recognize the user intent.

Yet another object of the present invention is to provide a method and a system for on-device intent detection, without using any API and server, thereby effectively improving a performance.

Yet another object of the present invention is to provide a method and a system for an on-device intent detection, employing a service application and partner application installed on the same user device, without using any API and server, thereby effectively improving a performance.

Yet another object of the present invention is to provide a method and a system for an on-device intent detection and integrating service application and partner application by using Android Interface Definition Language (AIDL) interface, and inter-process communication (IPC).

Yet another object of the present invention is to provide a method and a system for an on-device intent detection and communication at an operating system (OS) level.

These and other objects and advantages of the present invention will become readily apparent from the following detailed description taken in conjunction with the accompanying drawings.

SUMMARY OF THE INVENTION

The various embodiments of the present invention provide a method and a system for an on-device intent detection using streaming pipe inter-process communication. The method and system disclosed herein involves an on-device intent detection (ODI), that enables applications to recognize user interests. The method further involves recognizing the user intent as they type, which are essentially keywords using an AI model. These keywords are then communicated to a partner application, which has been installed on the user's device without the use of any API (Application Programming Interface) or server, thereby effectively improving performance. Hence, the present invention enables broadcasting the user's interest to the applications they use, thereby providing the user a smooth experience. Besides, the present invention helps in saving the user's list of keywords in an AI (Artificial Intelligence) enabled algorithm and sending the keywords to the partner application employing AIDL (Android Interface Definition Language) interface for inter-process communication (IPC).

According to one embodiment of the present invention, a method for an on-device intent detection using streaming pipe inter-process communication is provided. The method disclosed herein comprises recognizing a user intent detection, by an artificial intelligence (AI) algorithm, as the user inputs the user intent. The user intent includes keywords. The method further involves getting the keywords into a manipulative data structure. Furthermore, the method involves appending the manipulative data structure to an Android Interface Definition Language (AIDL) interface by a service application and returning a binder. The binder is an inter-process communication (IPC) mechanism used in an android. The AIDL allows to define the programming interface, such that both the client or partner and service agrees upon in order to communicate with each other using inter-process communication (IPC). The service application is an Input Method Editor (IME) application. Furthermore, the method involves creating a worker schedule by a partner application. The partner application is an application developed and owned by a third party, for which the customer or user purchases a license from Smartsheet under an order and is made available to the customer or user exclusively in accordance with the terms and conditions of the end user license agreements accompanying them, except that the payment provisions of the agreement will apply. The worker schedule is Work Manager, provided by android jetpack library, and has a member function do Work ( ). The method further includes integrating the partner application with the service application, by executing the worker schedule. Finally, the method involves storing the keywords by the partner application.

According to one embodiment of the present invention, the manipulative data structure is appended by obtaining the string from an Input Method Editor (IME) and adding to the AIDL interface, and the AIDL interface keeps the string in an android operating system level, handled using a stub. The stub is an auto generated file, when a developer attempts to define the AIDL interface, and contains all the function defined. The stub is written in AIDL and is automatically translated from java by the android studio. Furthermore, the IME is a user control, that enables user to enter the text.

According to one embodiment of the present invention, the inter-process communication mechanism involves transferring the keywords from the service application to the partner application, using AIDL interface, without using any server or API to store data. In an android a process is defined as an application, any application running on screen or in background is termed as process, when two processes communicate by any means and share data in any form is termed as an inter-process communication (IPC). Furthermore, the AIDL is a utility provided by the Google android framework to implement IPC. Hence, the method is carried out at the operating system level, therefore a significant change in time and resource requirement is evident.

According to one embodiment of the present invention, the Work Manager is a set of operations required to be performed, irrespective of whether the android gets restarted or involves any other interruption. The Work Manager performs the operation, whenever the worker schedule is scheduled. The operations performed by the Work Manager is also called background task, because they get performed even when the application is killed from background i.e., when the user is not using the application at that particular moment. Furthermore, the Work Manager consists of a member function do Work ( ), which is executed whenever the worker schedule is called or scheduled. The worker schedule is scheduled once every 15 minutes and implies that in every 15 minutes the do Work ( ) function gets executed. During every 15 minutes the partner application obtains the keywords from the AIDL stub by connecting to the service application, service component. The service component is an android component that runs in the background.

According to one embodiment of the present invention, the partner application is integrated to the service application using the AIDL interface, defined in both the service and partner application, having same package name. The same package name is a necessary condition for both the service and partner application to connect via AIDL. Furthermore, the package is a native java component, having each and every class or interface in the package.

According to one embodiment of the present invention, a system for an on-device intent detection using streaming pipe inter-process communication is provided. The system comprises an input/output module configured to receive and display a user intent. The user intent is essentially keywords. The system further comprises an intent detection module configured to generate the user intent and convert the user intent into a manipulative data structure. The manipulative data structure is further appended to an AIDL (Android Interface Definition Language) by a service application, and thereby returning a binder. The binder is an inter-process communication (IPC) mechanism used in an android. Furthermore, the intent detection module is configured to integrate the service application is to a partner application by executing a worker schedule provided by an android operating system. The worker schedule is created by the partner application and the worker schedule is Work Manager, provided by android jetpack library, and has a member function do Work ( ). Besides, the partner application is configured to store the keywords obtained from the service application.

According to one embodiment of the present invention, the manipulative data structure is appended by obtaining the string from an IME (Input Method Editor) and adding to the AIDL interface, and the AIDL interface keeps the string in the android operating system level, handled using a stub. The stub is an auto generated file, when a developer attempts to define the AIDL interface, and contains all the function defined. Furthermore, the IME is a user control, that enables user to enter the text.

According to one embodiment of the present invention, the inter-process communication mechanism involves transferring the keywords from the service application to the partner application, using AIDL interface, without using any server or API (Application Programming Interface) to store data.

According to one embodiment of the present invention, the Work Manager is a set of operations required to be performed, irrespective of whether the android gets restarted or involves any other interruption. Hence, the Work Manager performs the operation, whenever the worker schedule is scheduled. Furthermore, the member function does Work ( ) is executed whenever the worker schedule is called or scheduled. The worker schedule is scheduled once every 15 minutes and implies that in every 15 minutes the do Work ( ) function gets executed, every 15 minutes the partner application obtains the keywords from the AIDL stub by connecting to the service application, service component. The service component is an android component that runs in the background.

According to one embodiment of the present invention, the partner application is integrated to the service application using the AIDL interface, defined in both the service and partner application, having same package name. The same package name is a necessary condition for both the service and partner application to connect via AIDL. The package is a native java component, having each and every class or interface in the package.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which:

FIG. 4 illustrates a flowchart for a method to build service application from code, according to one embodiment of the present invention.

FIG. 5 illustrates a flowchart a method to build client or partner application from code, according to an embodiment of the present invention.

FIG. 6A-6C illustrates a screenshot of performance on method for on-device intent detection using streaming pipe inter-process communication, according to an embodiment of the present invention.

Figure 1:
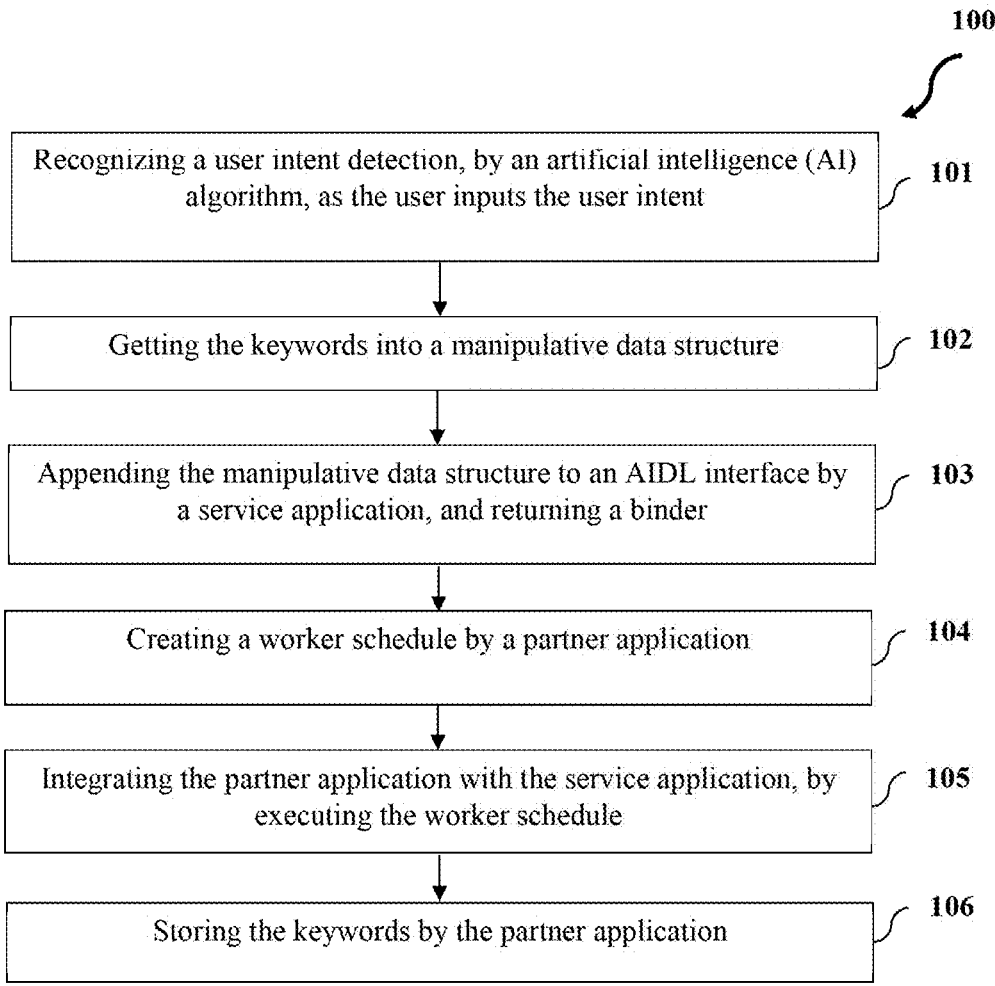
FIG. 1 illustrates a flowchart explaining the method for an on-device intent detection using streaming pipe inter-process communication, according to an embodiment of the present invention.

Although the specific features of the present invention are shown in some drawings and not in others. This is done for convenience only as each feature may be combined with any or all of the other features in accordance with the present invention.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The various embodiments of the present invention provide a method and a system for an on-device intent detection using streaming pipe inter-process communication. The method and system disclosed herein involves an on-device intent detection (ODI), that enables applications to recognize user interests. The method further involves recognizing the user intent as they type, which are essentially keywords. These keywords are then communicated to a partner application, which have been installed on the user's device without the use of any API (Application Programming Interface) or server, thereby effectively improving performance. Hence, the present invention enables broadcasting the user's interest to the applications they use, thereby providing the user a smooth experience. Besides, the present invention helps in saving the user's list of keywords in an AI (Artificial Intelligence) enabled algorithm and sending the keywords to the partner application employing AIDL (Android Interface Definition Language) interface for inter-process communication (IPC).

According to one embodiment of the present invention, a method for an on-device intent detection using streaming pipe inter-process communication is provided. The method disclosed herein comprises recognizing a user intent detection, by an artificial intelligence (AI) algorithm, as the user inputs the user intent. The user intent includes keywords. The method further involves getting the keywords into a manipulative data structure. Furthermore, the method involves appending the manipulative data structure to an AIDL (Android Interface Definition Language) interface by a service application and returning a binder. The binder is an inter-process communication (IPC) mechanism used in an android. The AIDL allows to define the programming interface, such that both the client or partner and service agrees upon in order to communicate with each other using inter-process communication (IPC). The service application is an IME (Input Method Editor) application. Furthermore, the method involves creating a worker schedule by a partner application. The partner application is an application developed and owned by a third party, for which the customer or user purchases a license from Smartsheet under an order and is made available to the customer or user exclusively in accordance with the terms and conditions of the end user license agreements accompanying them, except that the payment provisions of the agreement will apply. The worker schedule is Work Manager, provided by android jetpack library, and has a member function do Work ( ). The method further includes integrating the partner application with the service application, by executing the worker schedule. Finally, the method involves storing the keywords by the partner application.

According to one embodiment of the present invention, the manipulative data structure is appended by obtaining the string from an IME (Input Method Editor) and adding to the AIDL interface, and the AIDL interface keeps the string in an android operating system level, handled using a stub. The stub is an auto generated file, when a developer attempts to define the AIDL interface, and contains all the function defined. The stub is written in AIDL and is automatically translated from java by the android studio. Furthermore, the IME is a user control, that enables user to enter the text.

According to one embodiment of the present invention, the inter-process communication mechanism involves transferring the keywords from the service application to the partner application, using AIDL interface, without using any server or API (Application Programming Interface) to store data. In an android a process is defined as an application, any application running on screen or in background is termed as process, when two processes communicate by any means and share data in any form is termed as an inter-process communication (IPC). Furthermore, the AIDL is a utility provided by the Google android framework to implement IPC. Hence, the method is carried out at the operating system level, therefore a significant change in time and resource requirement is evident.

According to one embodiment of the present invention, the Work Manager is a set of operations required to be performed, irrespective of whether the android gets restarted or involves any other interruption. The Work Manager performs the operation, whenever the worker schedule is scheduled. The operations performed by the Work Manager is also called background task, because they get performed even when the application is killed from background i.e., when the user is not using the application at that particular moment. Furthermore, the Work Manager consists of a member function do Work ( ), which is executed whenever the worker schedule is called or scheduled. The worker schedule is scheduled once in every 15 minutes and implies that in every 15 minutes the do Work ( ) function gets executed. During every 15 minutes the partner application obtain the keywords from the AIDL stub by connecting to the service application, service component. The service component is an android component that runs in the background.

According to one embodiment of the present invention, the partner application is integrated to the service application using the AIDL interface, defined in both the service and partner application, having same package name. The same package name is a necessary condition for both the service and partner application to connect via AIDL. Furthermore, the package is a native java component, having each and every class or interface in the package.

According to one embodiment of the present invention, a system for an on-device intent detection using streaming pipe inter-process communication is provided. The system comprises an input/output module configured to receive and display a user intent. The user intent is essentially keywords. The system further comprises an intent detection module configured to generate the user intent and convert the user intent into a manipulative data structure. The manipulative data structure is further appended to an AIDL (Android Interface Definition Language) by a service application, and thereby returning a binder. The binder is an inter-process communication (IPC) mechanism used in an android. Furthermore, the intent detection module is configured to integrate the service application is to a partner application by executing a worker schedule provided by an android operating system. The worker schedule is created by the partner application and the worker schedule is Work Manager, provided by android jetpack library, and has a member function do Work ( ). Besides, the partner application is configured to store the keywords obtained from the service application.

According to one embodiment of the present invention, the manipulative data structure is appended by obtaining the string from an IME (Input Method Editor) and adding to the AIDL interface, and the AIDL interface keeps the string in the android operating system level, handled using a stub. The stub is an auto generated file, when a developer attempts to define the AIDL interface, and contains all the function defined. Furthermore, the IME is a user control, that enables user to enter the text.

According to one embodiment of the present invention, the inter-process communication mechanism involves transferring the keywords from the service application to the partner application, using AIDL interface, without using any server or API (Application Programming Interface) to store data.

According to one embodiment of the present invention, the Work Manager is a set of operations required to be performed, irrespective of whether the android gets restarted or involves any other interruption. Hence, the Work Manager performs the operation, whenever the worker schedule is scheduled. Furthermore, the member function do Work ( ) is executed whenever the worker schedule is called or scheduled. The worker schedule is scheduled once in every 15 minutes and implies that in every 15 minutes the do Work ( ) function gets executed. During every 15 minutes the partner application obtain the keywords from the AIDL stub by connecting to the service application, service component. The service component is an android component that runs in the background.

According to one embodiment of the present invention, the partner application is integrated to the service application using the AIDL interface, defined in both the service and partner application, having same package name. The same package name is a necessary condition for both the service and partner application to connect via AIDL. The package is a native java component, having each and every class or interface in the package.

FIG. 1 illustrates a flowchart on the method for an on-device intent detection using streaming pipe inter-process communication, according to an embodiment of the present invention. With regard to FIG. 1, represents an exemplary method 100 disclosed herein employs a method for an on-device intent detection using streaming pipe inter-process communication. The method 100 disclosed herein, comprises the steps of recognizing a user intent detection, by an artificial intelligence (AI) algorithm, as the user inputs the user intent at step 101. The user intent includes keywords. The method 100 further involves getting the keywords into a manipulative data structure at step 102. Furthermore, the method 100 involves appending the manipulative data structure to an AIDL (Android Interface Definition Language) interface by a service application and returning a binder at step 103. The binder is an inter-process communication (IPC) mechanism used in an android. The AIDL allows to define the programming interface, such that both the client or partner and service agrees upon in order to communicate with each other using inter-process communication (IPC). Furthermore, the method 100 involves creating a worker schedule by a partner application at step 104. The partner application is an application developed and owned by a third party, for which the customer or user purchases a license from Smartsheet under an order and is made available to the customer or user exclusively in accordance with the terms and conditions of the end user license agreements accompanying them, except that the payment provisions of the agreement will apply. The worker schedule is Work Manager, provided by android jetpack library, and has a member function do Work ( ). The method 100 further includes integrating the partner application with the service application, by executing the worker schedule at step 105. Finally, the method 100 involves storing the keywords by the partner application at step 106.

Figure 2:
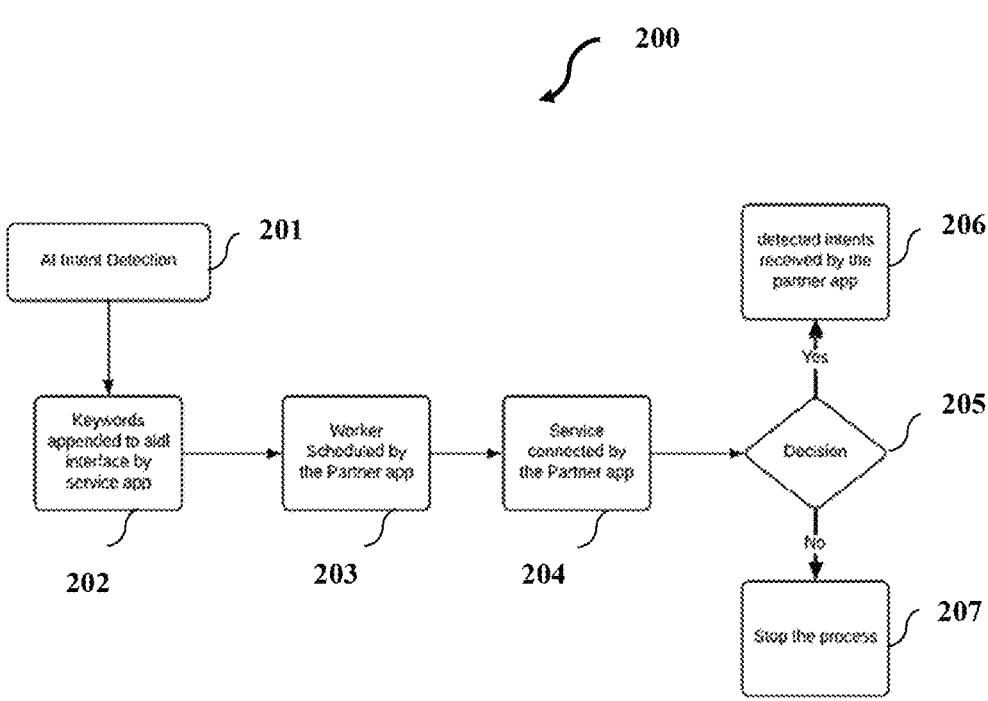
FIG. 2 illustrates a detailed flowchart for a method for an on-device intent detection using streaming pipe inter-process communication, according to an embodiment of the present invention.

FIG. 2 illustrates a detailed flowchart on method for an on-device intent detection using streaming pipe inter-process communication, according to an embodiment of the present invention. The method 200 disclosed herein, comprises recognizing a user intent detection, by an artificial intelligence (AI) algorithm, as the user inputs the user intent at step 201. The method 200 further involves getting the keywords and appending the keywords to an AIDL (Android Interface Definition Language) interface by a service application at step 202. The method 200 further involves creating a worker schedule by a partner application at step 203. Moreover, the method 200 involves integrating the partner application with the service application, by executing the worker schedule at step 204. Furthermore, at step 205, the method comprising AI (Artificial Intelligence) algorithm considers the keyword or user intent entered by the user as input and returns positive or negative intent as decision. If the intent is positive, the AI algorithm displays the set of keywords or detected intent received from the partner application at step 206. If the intent is negative, the AI algorithm stops the process at step 207.

Figure 3:
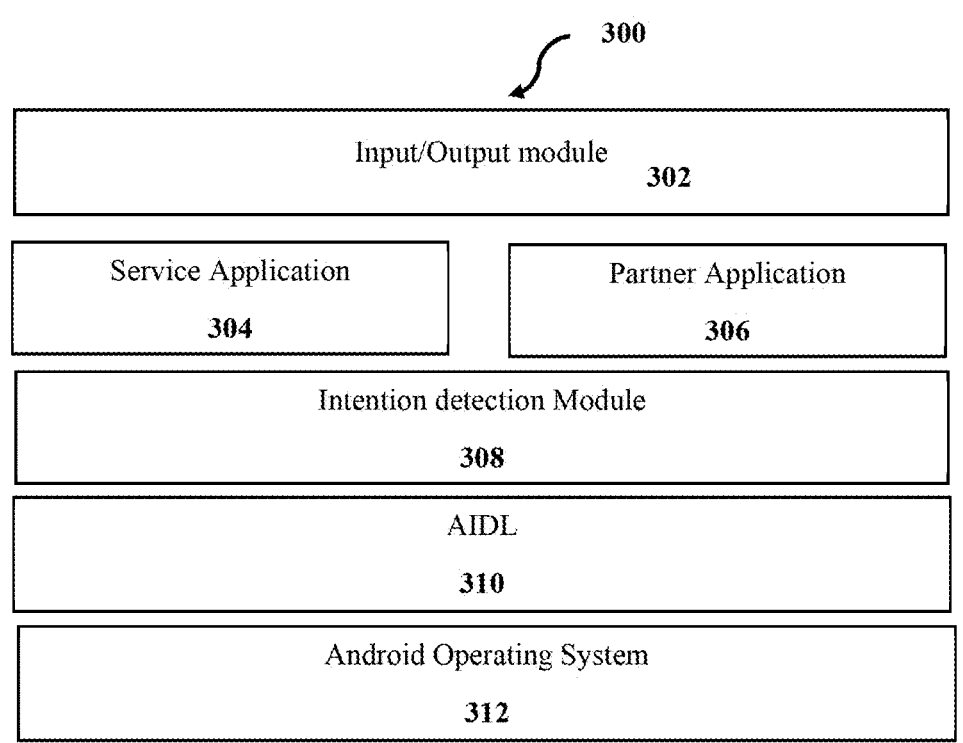
FIG. 3 illustrates a high-level block diagram of a system for an on-device intent detection using streaming pipe inter-process communication, according to an embodiment of the present invention.

FIG. 3 illustrates a high-level block diagram of a system for an on-device intent detection using streaming pipe inter-process communication, according to an embodiment of the present invention. In an embodiment, the system 300 comprises an input/output module 302 configured to receive and display a user intent. The user intent is essentially keywords. The system 300 further comprises an intent detection module 308 configured to generate the user intent and convert the user intent into a manipulative data structure. The manipulative data structure is further appended to an AIDL 310 (Android Interface Definition Language) by a service application 304, and thereby returning a binder. The binder is an inter-process communication (IPC) mechanism used in an android. Furthermore, the intent detection module is configured to integrate the service application 304 is to a partner application 306 by executing a worker schedule provided by an android operating system 312. The worker schedule is created by the partner application 306 and the worker schedule is Work Manager, provided by android jetpack library, and has a member function do Work ( ). Besides, the partner application 306 is configured to store the keywords obtained from the service application 304.

FIG. 4 illustrates a flowchart to build service application from code, according to an embodiment of the present invention. The flowchart depicts the service application 400, wherein the service application is an IME (Input Method Editor) application. The building to service application 400 from code comprises creating an AIDL file at step 401. The AIDL file is a specified file type in the android studio, written in java, where functions are declared in the interface. At step 402, rebuilding project is done. The rebuilding project creates a stub, which is written in AIDL. At step 403, the functions are defined in the AIDL interface. The functions that are used to share strings are declared. Further, at step 404, again rebuilding the project. During this rebuilding the project, helps to update out functions to the stub. At step 405, stub is created consisting of function. Furthermore, at step 406, a service class is defined. A service is an android component that is created to perform background tasks which has no UI (User Interface). In this service, the behaviour of the function is defined. At step 407, a stub object is created, which is returned as a binder and AIDL method is implemented. The object of the stub created previously, will be again created, and type casted as an interface. An interface is a native java non primitive data type, which can be defined and contains only abstract functions. Furthermore, at step 408, the stub object is returned through the on Bind ( ) method. During this step, the stub object created at step 407 is returned in the on Bind ( ) method, which is the member function of service class. Finally, at step 409, an intent filter is added in the manifest.xml file. An intent filter is basically used by the partner application to connect to the service application.

FIG. 5 illustrates a flowchart to build client or partner application from code, according to an embodiment of the present invention. The flowchart depicts the client or partner application 500, wherein the client application is also known as partner application, helps in IPC (inter-process communication) involving client server connection. The building to client application 500 from code comprises creating an AIDL file with same name and same package as created in the service application at step 501. Creating the AIDL file in client application is a necessary requirement for the service application 400 to connect through IPC. At step 502, rebuilding project is carried out. The rebuilding project creates a stub. At step 503, worker class is created and do Work ( ) member function is implemented. The worker class extends Work Manager API, which is part of jetpack compose library, and contains a member function called do Work ( ) which is called when a worker schedule is scheduled. Further, at step 504, a service connection object is created, and the AIDL interface stub reference is initialized by using as Interface ( ) method. A service connection object will initialize the AIDL interface object and allows the client application to call the functions defined in the service application 400. At step 505, an intent is created using the intent filter in the service application. The intent filter defined in the manifest of the service application 400 has a name, and a package, with the same name and package an intent is created. Further, using the intent, the service component of the service application is connected. At step 506, intent package is set with same package as that of the AIDL interface. Furthermore, at step 507, bind service method is called to connect to the service from the service application 400 in the do Work ( ) method. Furthermore, at step 508, method defined in AIDL interface is called. Once the service is connected, the methods defined in the AIDL interface is called in the partner application 500, and keywords are retrieved. Finally, at step 509, a Periodic Work Request object is created in the main activity, and enqueue the work using the defined object. The worker intended to be scheduled needs to enqueued.

Figure 6A:
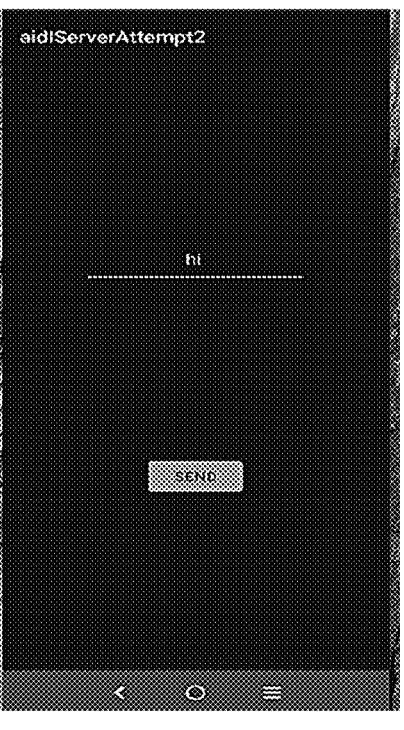
Figure 6B:
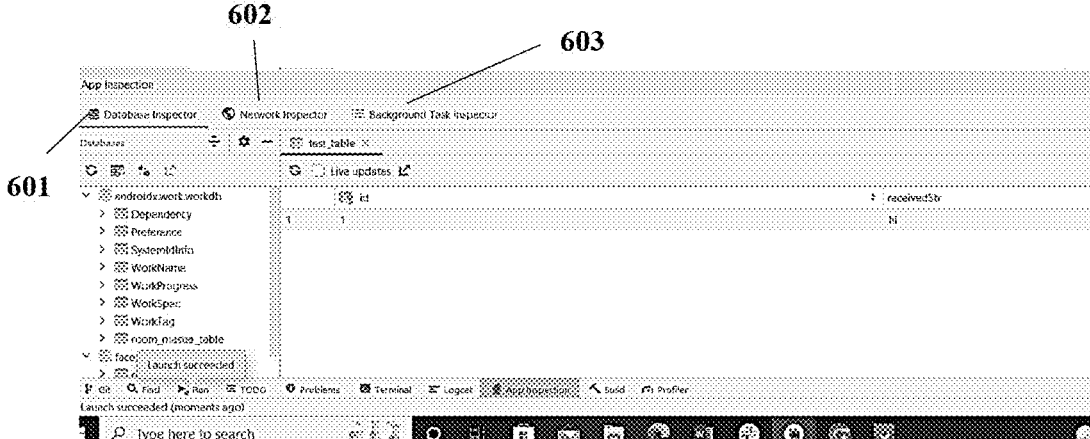
Figure 6C:
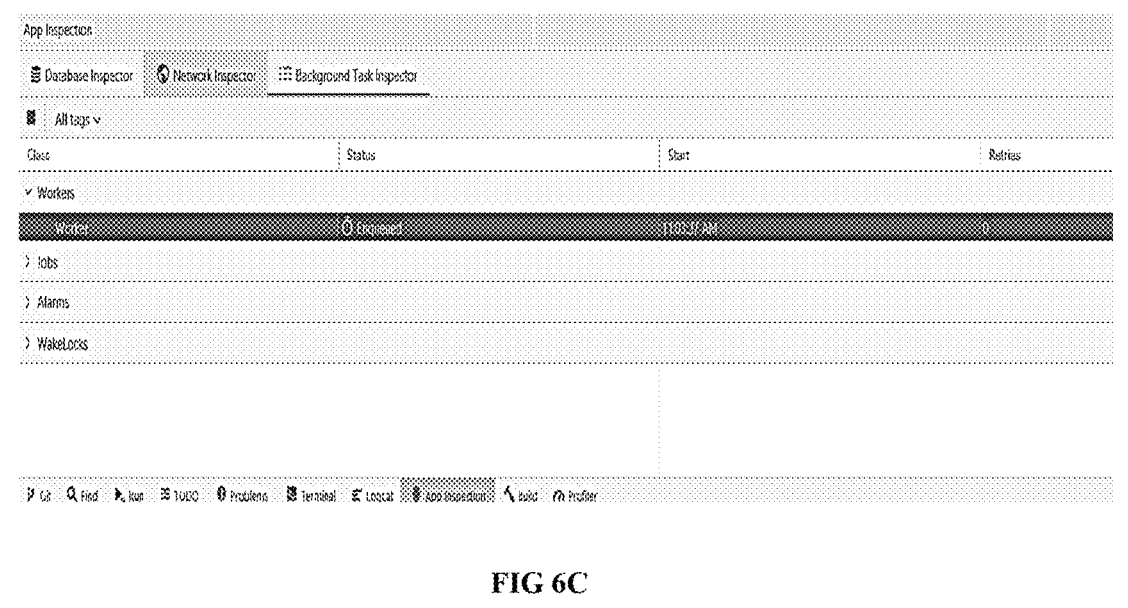

FIG. 6A-6C illustrates the screenshot of performance on method for on-device intent detection using streaming pipe inter-process communication, according to an embodiment of the present invention. FIG. 6A illustrates a screenshot, wherein the service application sends the string "hi". FIG. 6B illustrates a screenshot, wherein the partner application database has received the string "hi". The partner application database comprises tabs, such as database inspector 601, network inspector 602 and background task inspector 603. The database inspector 601, helps to observe the data that is inserted into the database. The database inspector in the FIG. 6B, illustrates that the keywords are successfully received and stored by the partner application which are sent from the service application. The network inspector 602, is a part of android studio's user interface and has other utilities. Furthermore, the background task inspector 603, helps in getting acknowledged about the background tasks like jobs worker etc., that are scheduled or have been carried out. Therefore, the FIG. 6B, illustrates the background task inspector, which basically shows that the worker that is getting scheduled by the partner application. Furthermore, the FIG. 6C illustrates that the worker is enqueued for next insertion.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Advantages of the Invention

The various embodiments of the present invention provides a method and a system for on-device intent detection using streaming pipe inter-process communication. The main advantage of the present invention is, that it does not use any API or internet and the process is carried out at the OS (Operating System) level, therefore a significant change in time and resource requirement is visible. The present invention also allows the intended applications to receive the requirements from the users directly, without any middlemen or intermediaries. The intended applications will also be able to directly suggest solutions to consumers. This direct communication between the users and the applications will become a great business utility. Furthermore, the intent detection will also help the users to get solutions directly from respective applications resulting in faster and seamless experience. Therefore, the present invention finds application in data science industry, as the present invention will make data collection really smooth and organized and will contribute to the e-commerce business a lot by letting them know what their user needs. In addition, the present invention also finds application in e-commerce, fintech, banking and trading.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

We claim:

1. A method using a streaming pipe inter-process communication (IPC) mechanism, comprising the steps of:
  receiving user intent from a user as the user inputs the user intent to an input/output module, wherein the user intent is keywords;
  storing the keywords into a manipulative data structure;
  appending the manipulative data structure to an Android Interface Definition Language (AIDL) interface by a service application;
  returning a binder, wherein the binder is the streaming pipe IPC mechanism used in an android;
  creating, by a partner application, a Work Manager provided by an android jetpack library, wherein the Work Manager has a member function do Work ( );
  integrating the partner application with the service application by executing the Work Manager; and
  storing the keywords by the partner application.

2. The method as claimed in claim 1, wherein:
  the manipulative data structure is appended by obtaining a string from an Input Method Editor (IME) and adding the string to the AIDL interface,
  the AIDL interface keeps the string in an android operating system level handled using a stub,
  the stub is an auto-generated file and contains all defined functions, and
  the IME is a user control that enables the user to enter the user intent.

3. The method as claimed in claim 1, wherein the streaming pipe IPC mechanism involves transferring the keywords from the service application to the partner application using the AIDL interface and without using any server or Application Programming Interface (API) to store data.

4. The method as claimed in claim 1, wherein:
  the Work Manager is a set of operations required to be executed irrespective of whether the android gets restarted or involves any other interruption, and
  the Work Manager executes the set of operations whenever the Work Manager is scheduled.

5. The method as claimed in claim 1, wherein:
  the member function do Work( ) is executed whenever the worker schedule Work Manager is called or scheduled,
  the do Work( ) function is executed every 15 minutes,
  during every 15 minutes the partner application obtains the keywords from the stub by connecting to the service application and a service component, and
  the service component is an android component that runs in the background.

6. The method as claimed in claim 1, wherein:
  the partner application is integrated to the service application using the AIDL interface,
  the AIDL interface is defined in both the service application and the partner application,
  the service application and the partner application have the same package name,
  the same package name is a necessary condition for both the service application and the partner application to connect via the AIDL interface, and
  a package associated with the same package name is a native java component having each and every class or interface in the package.

7. A system using a streaming pipe inter-process communication (IPC) mechanism, the system comprising:
  an input/output module configured to receive and display user intent, wherein the user intent is keywords; and
  an intent detection module configured to generate the user intent using an Artificial Intelligence (AI) algorithm or model and store the user intent into a manipulative data structure, wherein:
    the manipulative data structure is appended to an Android Interface Definition Language (AIDL) interface by a service application,
    a binder is returned, wherein the binder is the streaming pipe IPC mechanism used in an android,
    the service application is integrated to a partner application by executing a worker schedule provided by an android operating system,
    the worker schedule is associated with the partner application,
    the worker schedule is a Work Manager provided by an android jetpack library, and has a member function do Work( ), and
    the partner application is configured to store the keywords obtained from the service application.

8. The system as claimed in claim 7, wherein;

the manipulative data structure is appended by obtaining a string from an Input Method Editor (IME) and adding the string to the AIDL interface, the AIDL interface keeps the string in an android operating system level handled using a stub, the stub is an auto-generated file and contains all defined functions, and the IME is a user control that enables the user to enter the user intent.

9. The system as claimed in claim 7, wherein the streaming pipe IPC mechanism involves transferring the keywords from the service application to the partner application using the AIDL interface and without using any server or Application Programming Interface (API) to store data.

10. The system as claimed in claim 7, wherein:

the Work Manager is a set of operations required to be executed irrespective of whether the android gets restarted or involves any other interruption, and the Work Manager executes the set of operations whenever the Work Manager is scheduled.

11. The system as claimed in claim 7, wherein:

the member function do Work( ) is executed whenever the Work Manager is called or scheduled, the do Work( ) function is executed every 15 minutes, during every 15 minutes the partner application obtains the keywords from the stub by connecting to the service application and a service component, and the service component is an android component that runs in the background.

12. The system as claimed in claim 7, wherein:

the partner application is integrated to the service application using the AIDL interface, the AIDL interface is defined in both the service application and the partner application, the service application and the partner application have the same package name, the same package name is a necessary condition for both the service application and the partner application to connect via the AIDL interface, and a package associated with the same package name is a native java component having each and every class or interface in the package.

\*  \*  \*  \*  \*